United States Patent [19]

Shields et al.

[11] Patent Number: 5,181,045
[45] Date of Patent: Jan. 19, 1993

[54] BLEED ALLEVIATION USING PH-SENSITIVE DYES

[75] Inventors: James P. Shields; Raymond J. Adamic, both of Corvallis, Oreg.

[73] Assignee: Hewlett-Packard Company, Palo Alto, Calif.

[21] Appl. No.: 764,014

[22] Filed: Sep. 23, 1991

[51] Int. Cl.$^5$ .......................... B41J 2/21; C09D 11/02
[52] U.S. Cl. .................................. 346/1.1; 106/22 D; 106/22 K; 346/140 R
[58] Field of Search .............. 346/1.1, 140 R; 106/20, 106/22

[56] References Cited

U.S. PATENT DOCUMENTS

| | | | |
|---|---|---|---|
| 3,889,271 | 6/1975 | Freytag | 346/1.1 |
| 4,533,920 | 8/1985 | Suzuki | 346/1.1 |
| 4,963,189 | 10/1990 | Hindagolla | 106/22 |
| 5,062,893 | 11/1991 | Adamic | 106/22 |
| 5,106,416 | 4/1992 | Moffatt | 106/20 |

Primary Examiner—Joseph W. Hartary

[57] ABSTRACT

Certain dyes become insoluble under specific and well-defined pH conditions. By forcing a dye to become insoluble on the page, migration of the dye is inhibited, thereby helping to reduce bleed between inks of different colors. The dye is forced out of solution from the ink by contact with another ink having the appropriate pH (either higher or lower than that of the first ink).

6 Claims, 9 Drawing Sheets

ROWS OF OVERLAP

FIG. 3B

ROWS OF OVERLAP

FIG. 3C

ROWS OF OVERLAP

FIG. 3D

ROWS OF OVERLAP

ROWS OF OVERLAP

FIG. 4D

ROWS OF OVERLAP

FIG. 5A

ROWS OF OVERLAP

FIG. 5B

ROWS OF OVERLAP

FIG. 5C

ROWS OF OVERLAP

FIG. 5D

ROWS OF OVERLAP

FIG. 6A

ROWS OF OVERLAP

FIG. 6B

ROWS OF OVERLAP

FIG.6C

ROWS OF OVERLAP

FIG.6D

ROWS OF OVERLAP

BLEED ALLEVIATION USING PH-SENSITIVE DYES

TECHNICAL FIELD

The present invention relates to inks employed in ink-jet printing, especially in thermal ink-jet printing, and, more particularly, to colored and black ink compositions in which color bleed is substantially reduced or even eliminated.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of heating on the ink composition.

Many thermal ink-jet inks, when printed in various colors on bond paper, copier paper, and other media, can lead to bleed. The term "bleed", as used herein, is defined as follows: When inks of two different colors are printed next to each other, it is desired that the border between the two colors be clean and free from the invasion of one color into the other. When one color does invade into the other, the border between the two colors becomes ragged, and this is bleed.

This is in contradistinction to uses of the term in the prior art, which often defines "bleed" in the context of ink of a single color following the fibers of the paper.

Prior solutions to bleed have largely involved the use of heated platens or other heat sources and/or special paper. Heated platens add cost to the printer. Special paper limits the user to a single paper, which is of a higher cost than a "plain" paper.

A need remains for ink compositions for use in ink-jet printing, particularly thermal ink-jet printing, which do not evidence bleed, as defined herein, when printed on plain papers and without the use of heaters, and yet which possess relatively long shelf life and other desirable properties of such inks.

DISCLOSURE OF INVENTION

In accordance with the invention, certain dye classes are used which become insoluble under specific and well-defined pH conditions. By forcing the dye to become insoluble on the page, migration of the dye is inhibited, thereby helping to reduce bleed between different colors. Rendering the dye insoluble is achieved by making the dye come out of solution or to precipitate; this is done by contacting the dye with another ink having an appropriate pH.

BEST MODES FOR CARRYING OUT THE INVENTION

It is known that certain dye classes become insoluble under specific and well-defined pH conditions. Examples of such dyes are carboxylated dyes, such as azo dyes, xanthene dyes, copper phthalocyanine dyes, and the like. Other dyes exhibiting differential solubility with pH are also useful in the practice of the invention.

Without subscribing to any particular theory, Applicants believe that by forcing a dye to become insoluble on the page, then migration of the dye will be inhibited, thereby helping to reduce bleed between different colors. The "force" used to make the dye come out of solution or to precipitate is to contact the dye with another ink having an appropriate pH.

An example of an ink that contains such a dye has a formulation given by:
- 7.5% 2-pyrrolidone,
- 0.1% $(NH_4)_2HPO_4$,
- about 2% of a carboxylated azo dye,
- and the balance water.

The dye in this ink is known to come out of solution as the pH drops down to about 6.5 to 7.0. If dots of another ink, having a relatively low pH, say about 4.0, are laid down next to dots of the first ink, then the dye from the first ink will fall out of solution (precipitate). The belief at this point is that this will slow down the migration of the dye and therefore help to reduce bleed between the two inks.

Such an effect is not to be confused with the use of pH changes on paper which lead to improved waterfastness. First, waterfastness issues involve the ability of the ink to resist smearing when water is dripped across a printed line of ink, while bleed resistance is the ability of the ink to resist mixing of one color with another when both are printed in close succession. Having solved one problem does not imply a solution to the other.

Solving waterfastness in other systems has involved the use of a single ink. This is in contrast to the present disclosure in which a second ink is used to bring about the desired effect, i.e., reduction of bleed.

In addition, the present disclosure involves what is essentially a border effect, i.e., the drastic pH conditions of the two inks in question bring about the desired effect at the border of the two inks. This is to be contrasted with the mode by which other inks in which waterfastness is presumably achieved, i.e., an entire dot of black ink is subjected to paper which lowers the pH slightly and brings about insolubility (and thus waterfastness); see, e.g., U.S. Pat. No. 4,963,189.

Finally, it should be mentioned that using a second ink with a pH of, for example, 4 will have a much greater effect on the solubility of the pH-sensitive dye than will any pH change caused by the paper. Paper-induced pH changes in the ink are small compared to contact with a fluid that is buffered at a pH of 4.

Thus, while it is thought that the pH of the paper itself contributes to an improvement of waterfastness, in the present application, a second ink, having a pH low enough to bring about insolubility of dye in the first ink, is used to bring about the desired effect, i.e., bleed reduction.

The method of the invention eliminates the requirement of a heater or heated platen in order to reduce bleed from an ink of one color into an ink of another color.

While the specific example given is directed to the use of an ink having a lower pH than the first ink, it is also possible to employ an ink having a higher pH than the initial ink. In this case, the pH-sensitive ink would have the property that it precipitates as the pH is increased.

The effect on bleed may be seen at a pH difference of about 1 to 3 units. Further and near complete control of bleed results when the pH difference is further increased, to about 4 to 5 units. However, these values do not preclude the use of a dye which is more sensitive to pH than those disclosed herein; with more sensitive pH-dyes, near complete control of bleed could result with only a small difference in pH, considerably less than 4 units.

In addition, if the ink containing the pH-sensitive dye contains a buffer, its buffer capacity must not be so high as to overwhelm the effects of the low pH ink. In practice, as shown in FIGS. 4a-d, the bleed effect can work when the ink containing the pH-sensitive dye contains a buffer, such as tris[hydroxymethyl]aminomethane or a phosphate or borate buffer.

EXAMPLES

Example 1

Vertical bars of black ink intermixed with yellow ink were printed. The black ink comprised 0.2% BORAX buffer, 7.5% 2-pyrrolidone, 0.1% $(NH_4)_2HPO_4$, about 2% of a carboxylated azo dye, and the balance water; the pH of this black ink was 9.0. The yellow ink comprised 5.5% DEG, about 2% Direct Yellow 86 dye, and the balance water; the pH of this yellow ink was 7.9.

Figure 1:
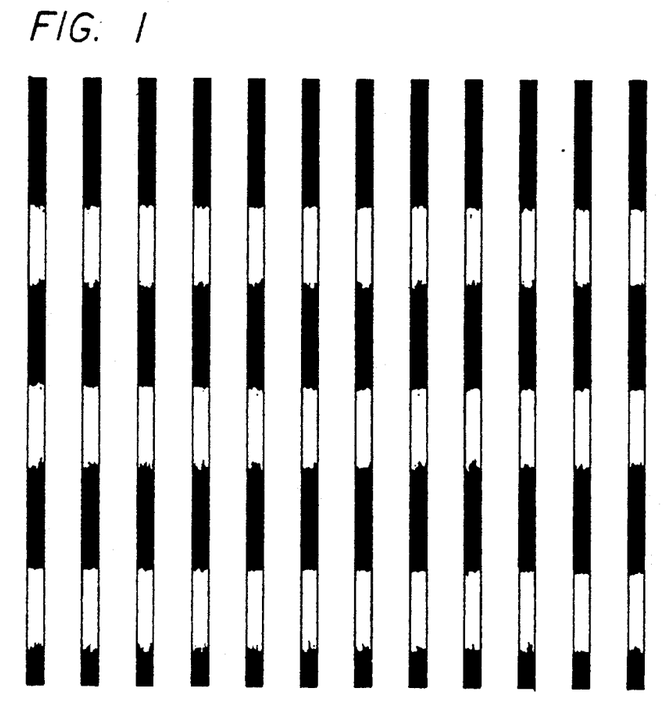
FIG. 1 is a line drawing representative of printing two colors evidencing bleed.

Printing was done using a conventional DeskJet ® printer (DeskJet is a trademark of Hewlett-Packard Company); since this is a one-pen printer, the pens containing the two inks were quickly swapped at the appropriate time during printing. The swap took about 3 seconds per color change. As can be seen in FIG. 1, extensive bleed of the black ink into the yellow ink occurred. FIG. 1 is a line drawing of the actual result obtained.

Example 2

In this example, the yellow ink of Example 1 was adjusted to a pH of 4.6 with HCl and buffered with citric acid. Otherwise, both inks were identical as in Example 1.

Figure 2:
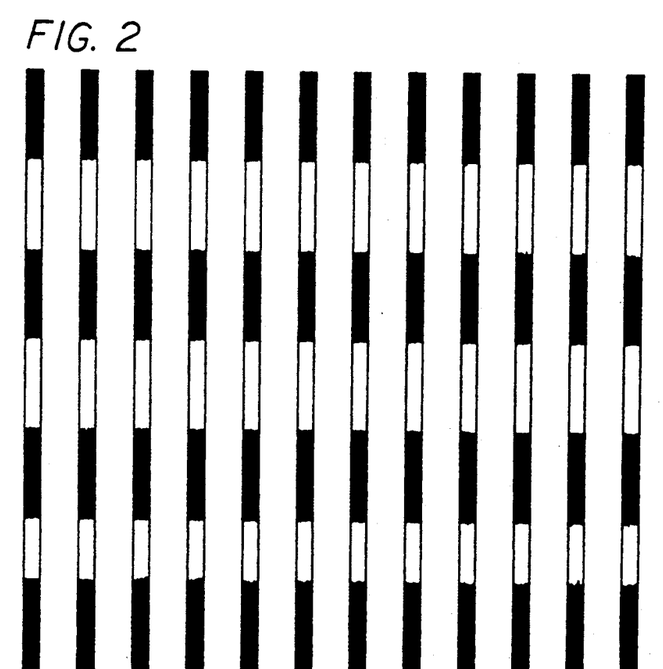
FIG. 2 is a line drawing representative of printing two colors in which bleed has been substantially reduced.
Figure 3A:
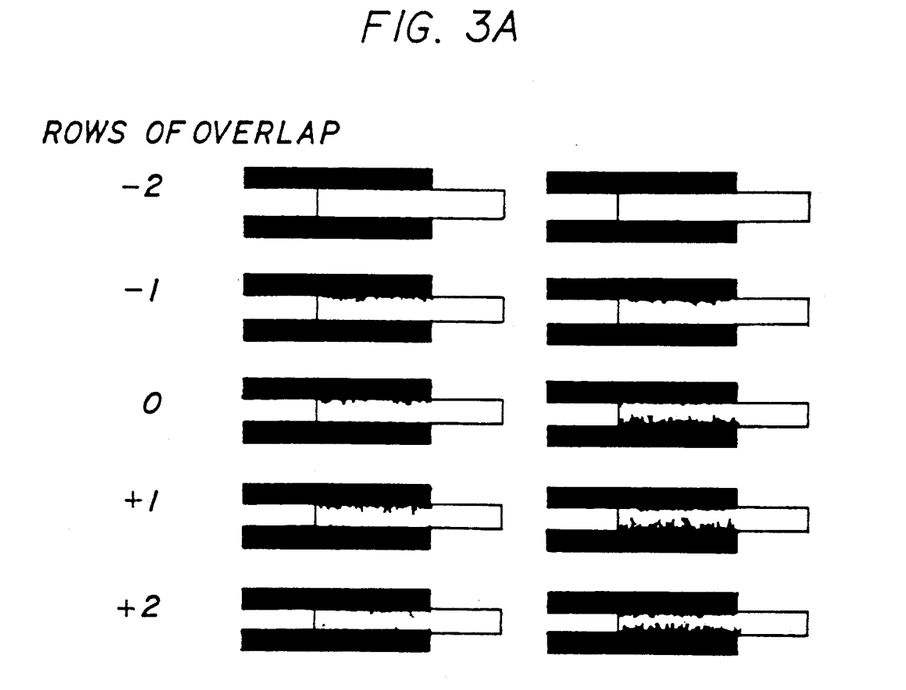
FIGS. 3A-D, 4A-D, 5A-D and 6A-D are line drawings representative of printing two colors, comparing the results of color bleed under different pH conditions, with each Figure representing a different color set.
Figure 3B:
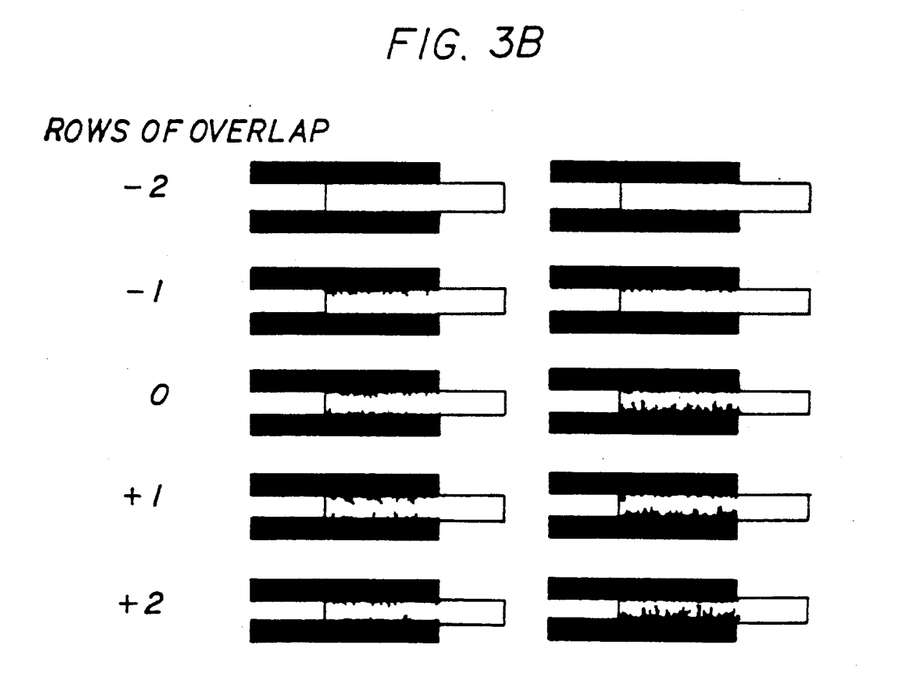
Figure 3C:
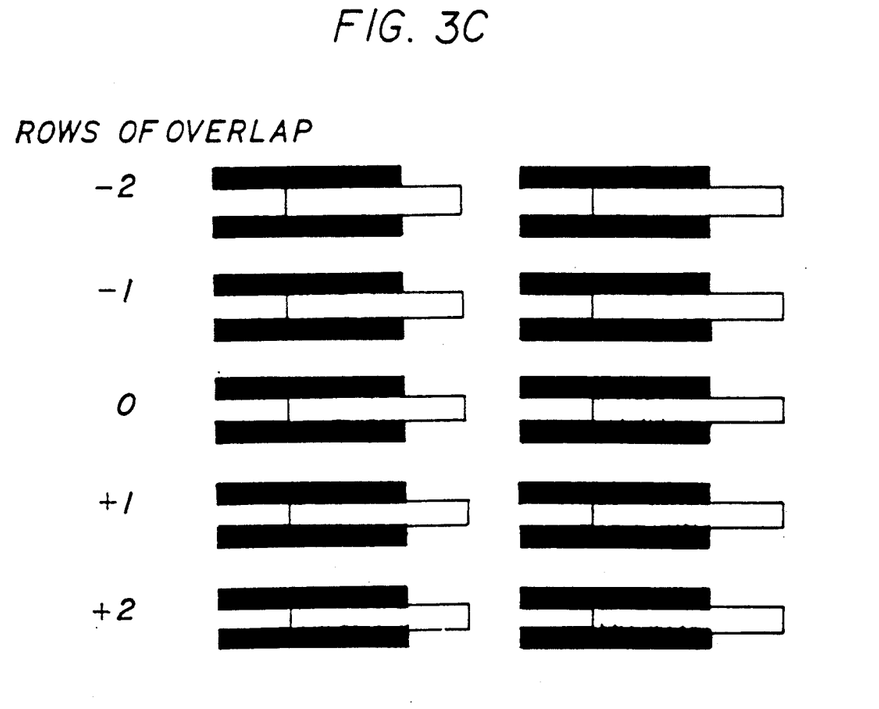
Figure 3D:
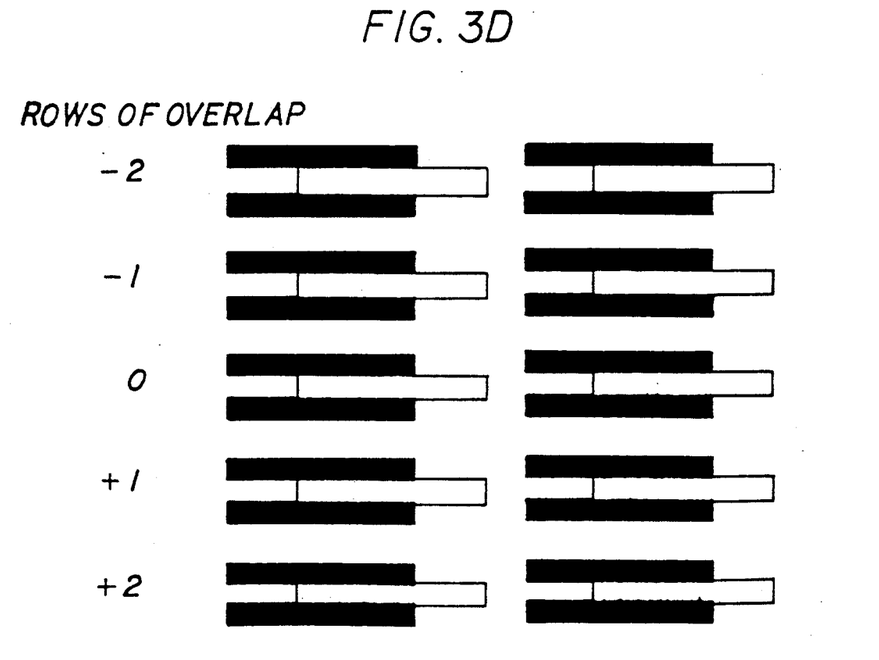
Figure 4A:
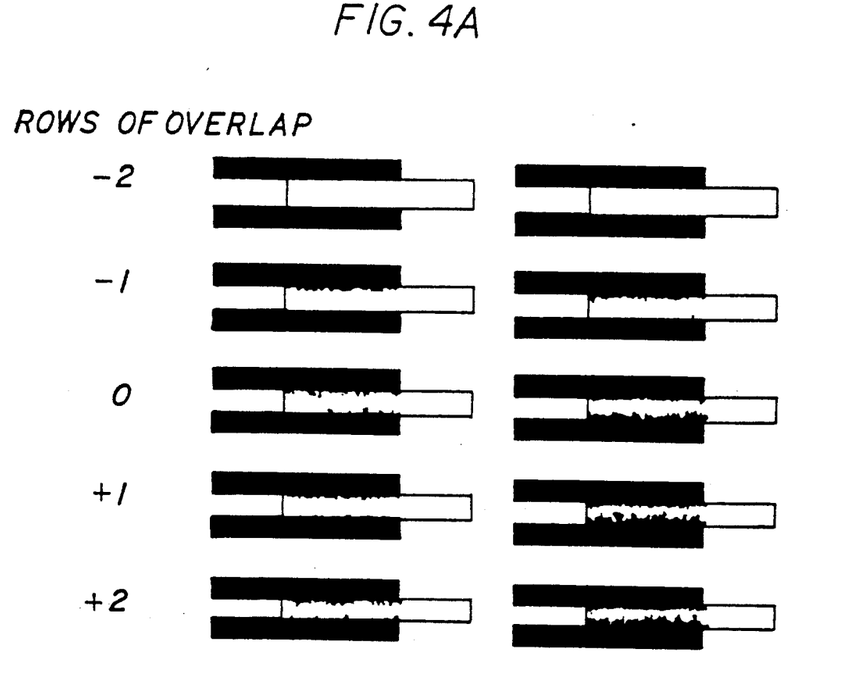
Figure 4B:
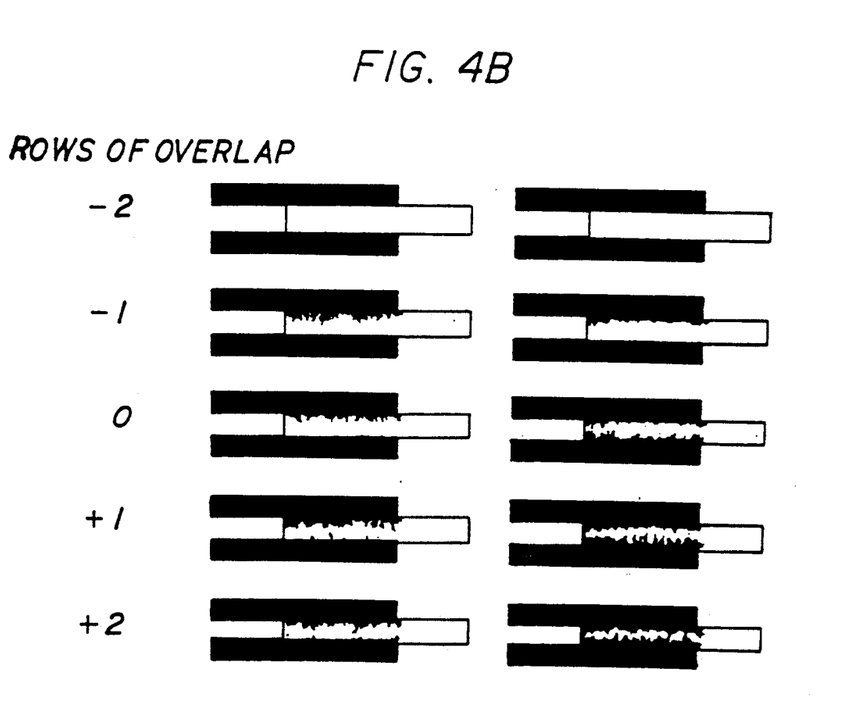
Figure 4C:
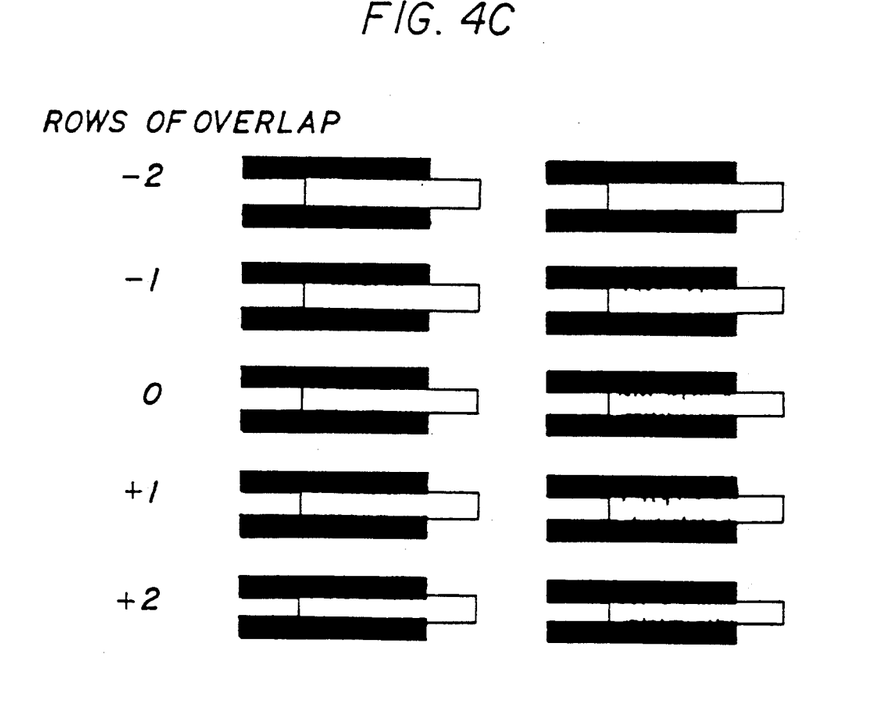
Figure 4D:
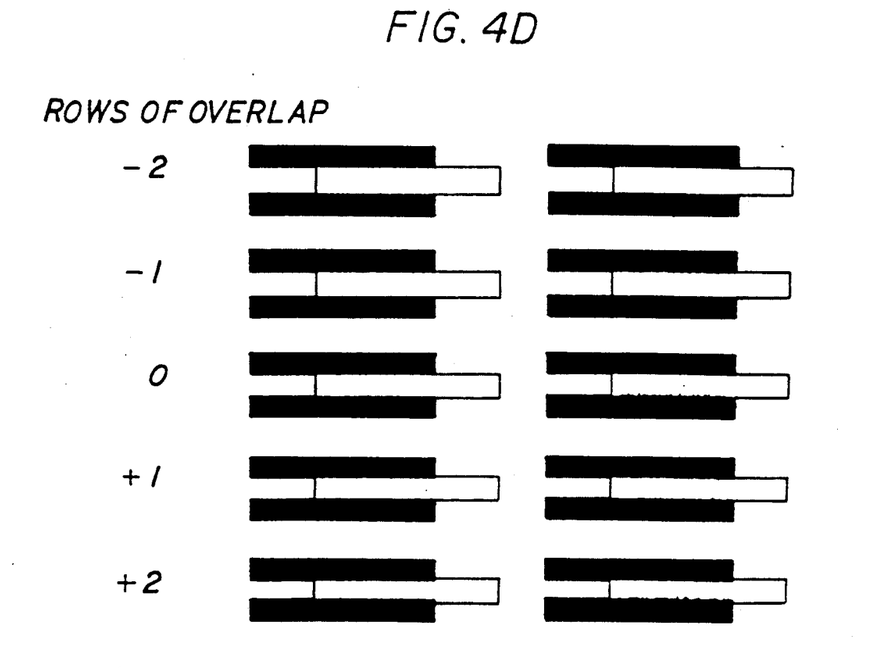
Figure 5A:
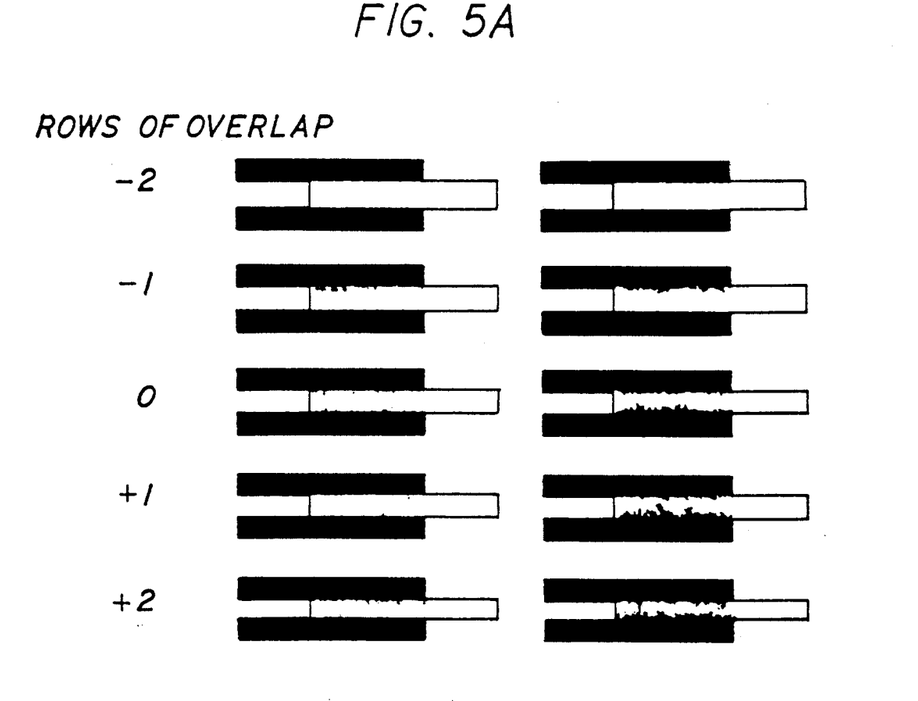
Figure 5B:
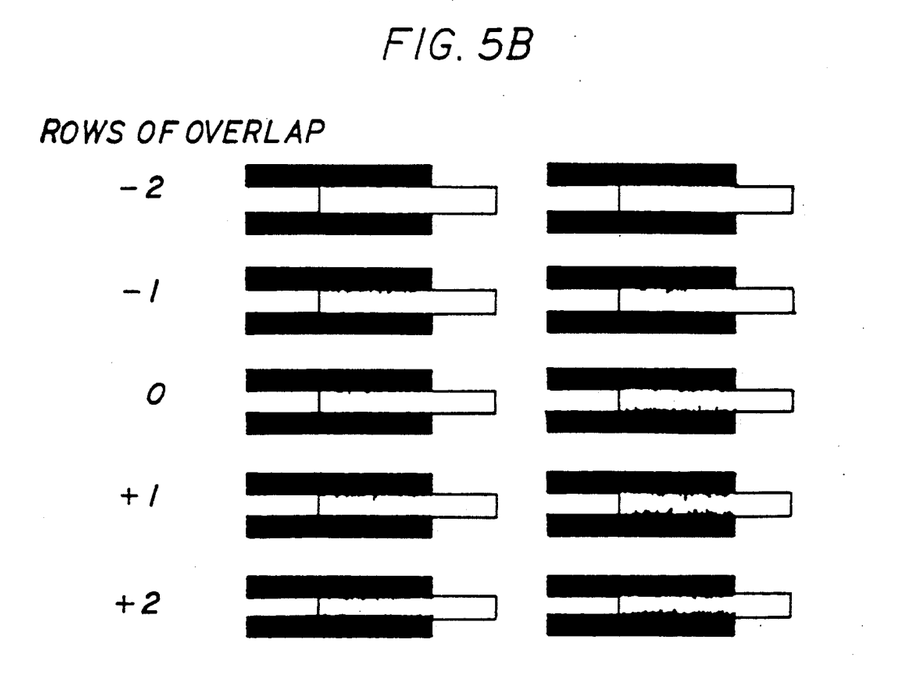
Figure 5C:
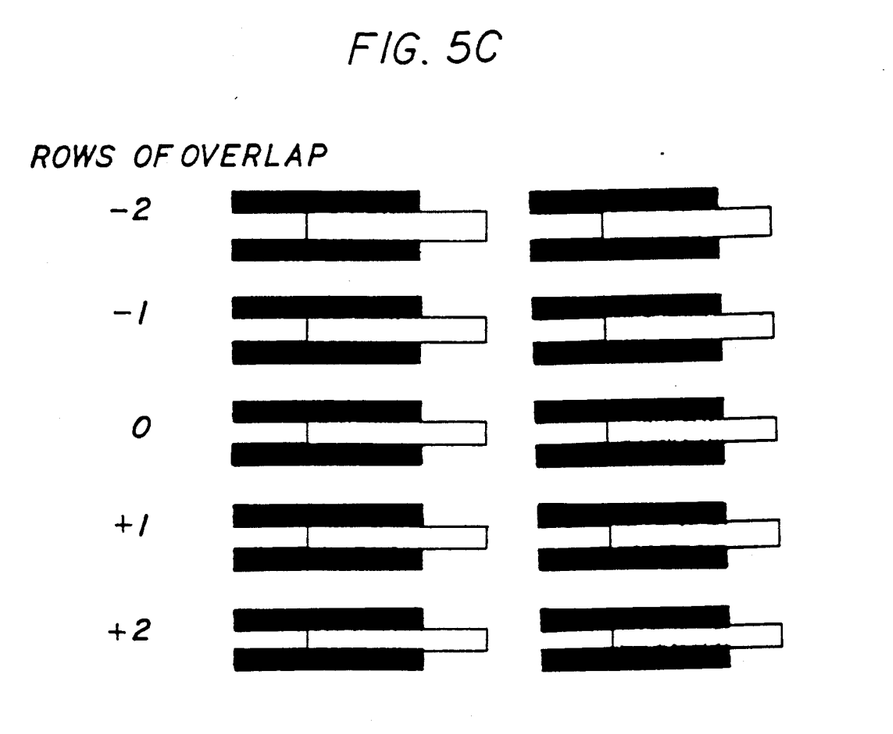
Figure 5D:
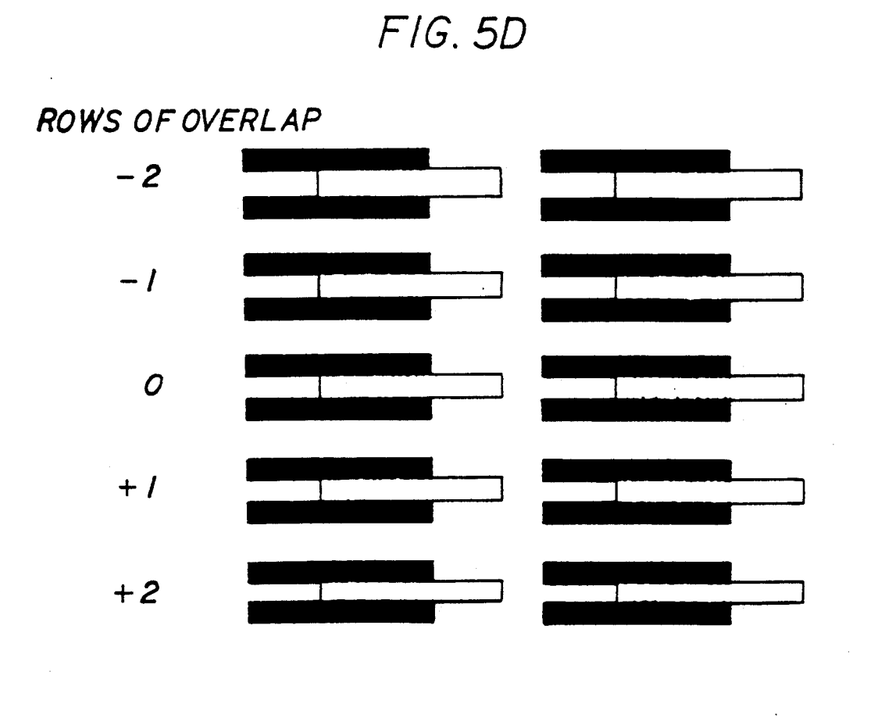
Figure 6A:
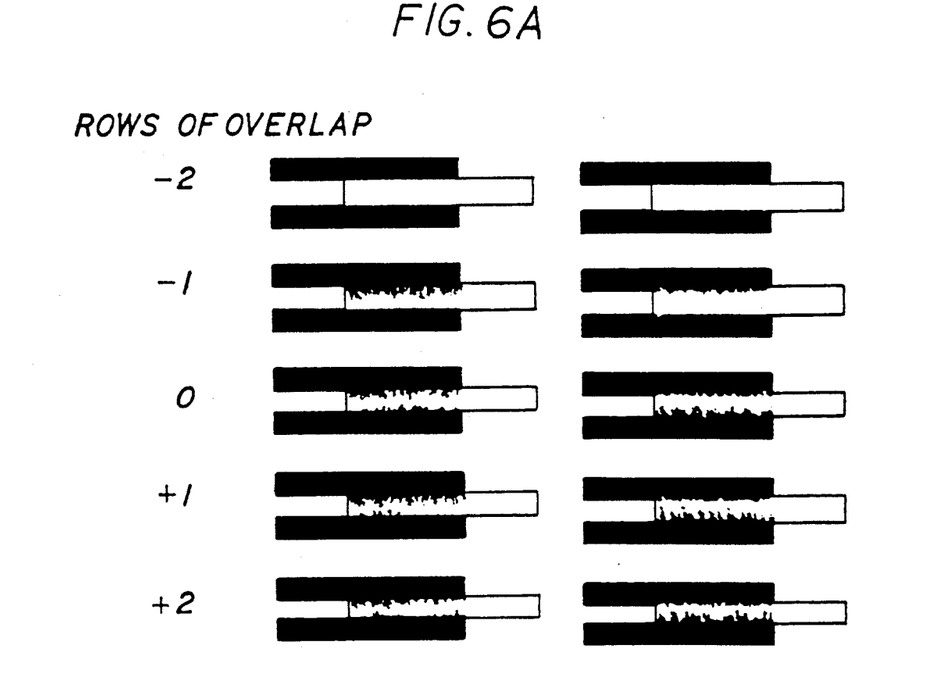
Figure 6B:
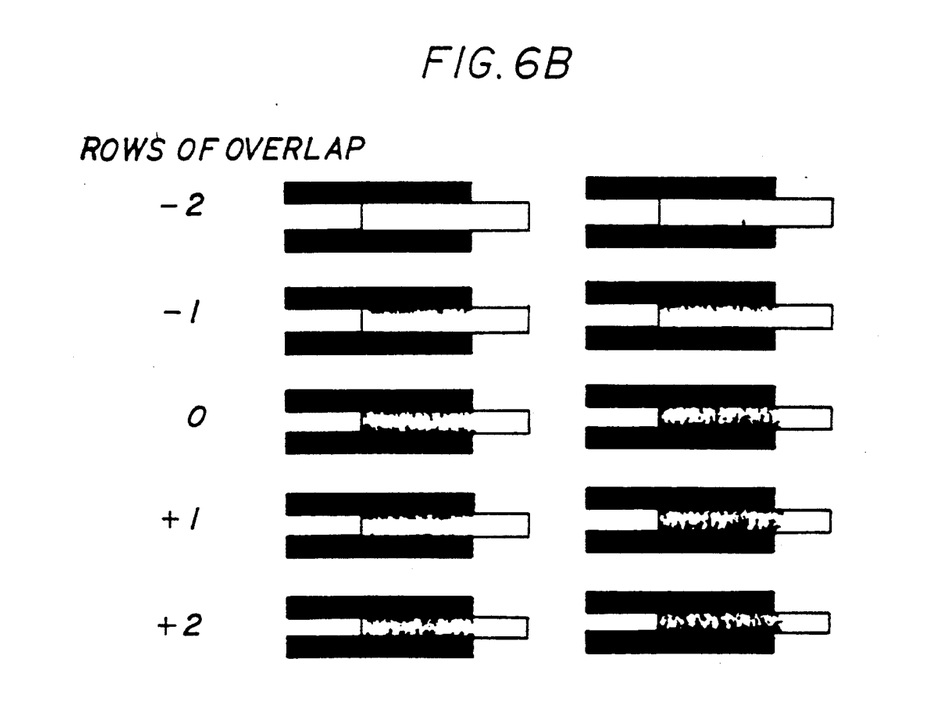
Figure 6C:
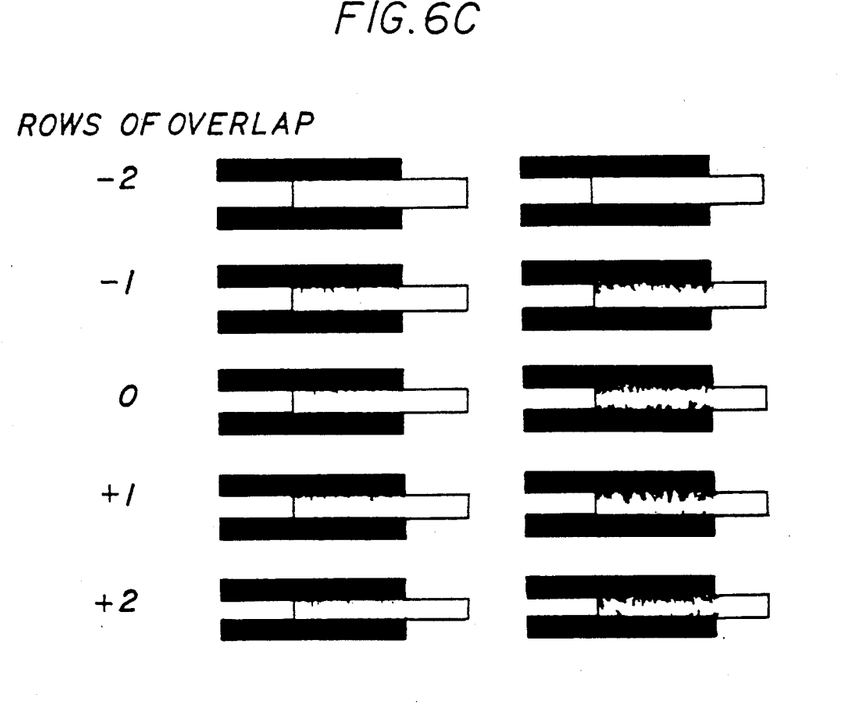
Figure 6D:
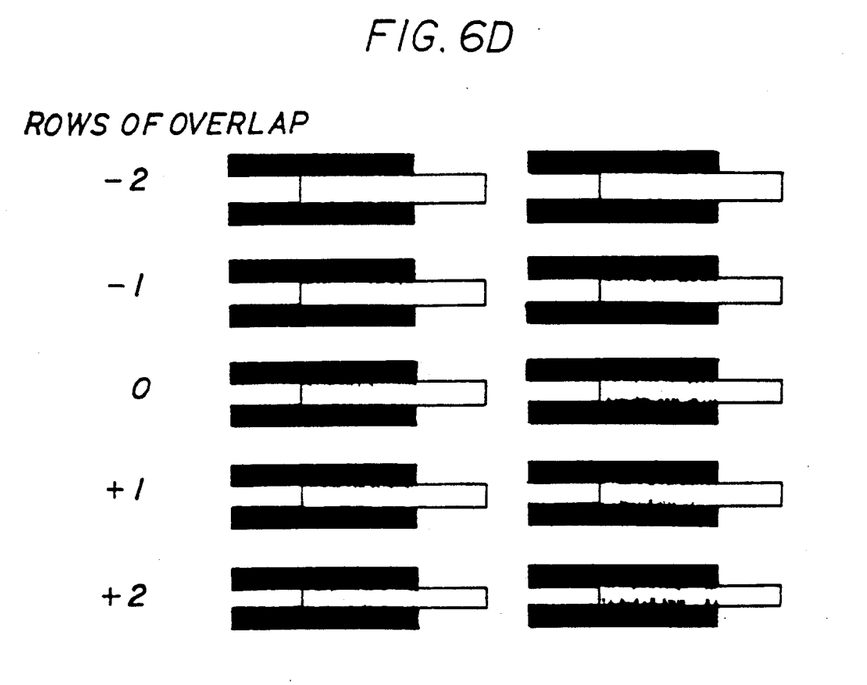

Upon printing as in Example 1, virtually no bleed of the black ink into the yellow ink occurred, as can be seen in FIG. 2.

Example 3

In this Example, a DeskJet printer was modified such that it can carry two pens. One of these pens was a tri-chamber pen and the other was a single-chamber pen. However, there is no reason why both pen positions could not be occupied by tri-chamber pens or both by single-chamber pens. However, for this implementation, a pen of each type was used in the two pen positions.

In addition, there is no reason why the tri-chamber pen can not be filled with any combination of inks varying in color or formulation. Further, one or more chambers could be filled with a fluid that does not contain a colorant. In other words, a chamber could be filled with a "fixer", which could be a solution with a pH appropriate to bring about the desired effect.

In this implementation, all chambers of the tri-chamber pen were filled with the same ink. Furthermore, the inks in the tri-chamber pen were all the same color—yellow. The single chamber pen was filled with a second color: black ink (FIGS. 3a-d and 4a-d), cyan ink (FIGS. 5a-d) or magenta ink (FIGS. 6a-d).

Referring to FIGS. 3–6, the yellow ink is represented by the white areas and the second color ink by the black areas. In the first column of the print sample, one bar of yellow ink is printed between two bars of the second color ink. The second column represents a double density of the yellow ink which is contained in the tri-chamber pen. The bars of the second color ink in the second column are identical to those in the first column. Thus, it would be expected that the bleed between the second color and yellow would be worse in the second column compared to the first column.

The rows in FIGS. 3–6 represent various amounts of overlap between the color bars (black, cyan, or magenta, as previously indicated) and the yellow bars. Thus, in the row marked "−2", there are two blank dot rows between the color and yellow bars. In the row marked "0", there are no blank dot rows between the color and yellow bars. In other words, the color and yellow bars are printed directly adjacent one another. Finally, in the row marked "+2", the color and yellow bars actually overlap by two dot rows. It would be expected that the bleed between colors would become progressively worse from the top row to the bottom row within a given column.

All yellow ink in FIGS. 3–6 has the following composition:

| Diethylene glycol | 5.5 wt % |
| Acid Yellow 23 dye | 2 to 4 wt % |
| Water | balance. |

These inks were distinguished by the following letter designations, as shown in the Figures:

(A) No buffer; composition as above.
(B) pH adjusted to 5.6; buffered with acetate buffer.
(C) pH adjusted to 4.6; buffered with acetate buffer.
(D) pH adjusted to 3.6; buffered with acetate buffer.

All black ink in FIG. 3 had the following composition:

| 2-pyrrolidone | 7.5 wt % |
|---|---|
| carboxylated azo dye | 2.2 wt % |
| (NH4)2HPO4 | 0.1 wt % |
| Water | balance. |

The pH of this ink was adjusted to 8.3 using NH4OH, but this ink had only a small buffer capacity from the (NH4)2HPO4.

All black ink in FIG. 4 had the following composition:

| 2-pyrrolidone | 7.5 wt % |
|---|---|
| carboxylated azo dye | 2.2 wt % |
| tris[hydroxymethyl]amino-methane buffer | 0.2 wt % |
| Disodium ethylenediamine-tetraacetic acid (EDTA) | 0.1 wt % |
| PROXEL GXL biocide | 0.3 wt % |
| (NH4)2HPO4 | 0.1 wt % |
| Water | balance. |

The pH of this ink was adjusted to 8.5 using NH4OH and had additional buffer capacity provided by the TRIS buffer.

All cyan ink in FIG. 5 had the following composition:

| 2-pyrrolidone | 7.5 wt % |
|---|---|
| experimental carboxylated cyan dye | 3 wt % |
| Water | balance. |

The pH was adjusted to 9.3 with NH4OH. This experimental dye is in the copper phthalocyanine class.

All magenta ink in FIG. 6 had the following composition:

| 2-pyrrolidone | 7.5 wt % |
|---|---|
| experimental carboxylated magenta dye | 3 wt % |
| Water | balance. |

The pH was adjusted to 8.5 with NH4OH. This experimental dye is in the xanthene class.

FIGS. 3-6 show that as the pH is successively lowered from A to B to C to D, the bleed control is improved. This is shown for three different pH-sensitive dyes: the carboxylated azo dye, the experimental copper phthalocyanine dye, and the experimental xanthene dye.

INDUSTRIAL APPLICABILITY

The method of reducing bleed is expected to find use in ink-jet printing applications involving two or more colors.

Thus, there has been disclosed a method of reducing bleed in printing at least two different colors on a print medium from an ink-jet pen. It will be readily apparent to those skilled in this art that various changes and modifications may be made without departing from the spirit of the invention, and all such changes and modifications are considered to fall within the scope of the invention as defined by the appended claims.

What is claimed is:

1. A method of reducing bleed in printing at least two different colors on a print medium from an ink-jet pen, comprising printing a first ink containing a dye that is sensitive to pH and printing a second ink having an appropriate pH to cause said dye of said first ink to precipitate out on said print medium.

2. The method of claim 1 wherein said second ink has a pH that is lower than that of said first ink.

3. The method of claim 2 wherein said first ink contains a dye selected from the group consisting of carboxylated azo dyes, carboxylated copper phthalocyanine dyes, carboxylated xanthene dyes, and dyes whose solubility decreases as pH is lowered.

4. The method of claim 3 wherein said first ink comprises 7.5% 2-pyrrolidone, 0.1% (NH4)2HPO4, about 2% of at least one carboxylated azo dye, and the balance water and having a pH of about 9.0 and wherein said second ink comprises 5.5% DEG, about 2% Direct Yellow 86 dye, and the balance water and having a pH of said second ink of about 4.6.

5. The method of claim 3 wherein said first ink is selected from the group consisting of (a) about 7.5% 2-pyrrolidone, about 2.5% carboxylated azo black dye, about 0.1% (NH4)2HPO4, and the balance water and having a pH adjusted to about 8.3; (b) about 7.5% 2-pyrrolidone, about 2.5% carboxylated azo black dye, about 0.2% tris[hydroxymethyl]aminomethane buffer, about 0.1% disodium ethylenediaminetetraacetic acid (EDTA), about 0.3% biocide, about 0.1% (NH4)2HPO4, and the balance water and having a pH adjusted to about 8.5; (c) about 7.5% 2-pyrrolidone, about 3% carboxylated copper phthalocyanine cyan dye, and the balance water and having a pH adjusted to about 9.3; and (d) about 7.5% 2-pyrrolidone, about 3% carboxylated xanthene magenta dye, and the balance water and having a pH adjusted to about 8.5, and wherein said second ink comprises about 5.5% diethylene glycol, about 2 to 4% Acid Yellow 23 dye, and the balance water and having a pH adjusted to about 3.6 to 5.6.

6. The method of claim 1 wherein said second ink has a pH that is higher than that of said first ink.

* * * * *